United States Patent [19]

Orndorff, Jr. et al.

[11] Patent Number: 5,007,660
[45] Date of Patent: Apr. 16, 1991

[54] SUSPENSION SYSTEM

[75] Inventors: Roy L. Orndorff, Jr., Kent; Mark J. Bono, Munroe Falls, both of Ohio

[73] Assignee: The B. F. Goodrich Company, Akron, Ohio

[21] Appl. No.: 394,904

[22] Filed: Aug. 17, 1989

Related U.S. Application Data

[63] Continuation-in-part of Ser. No. 297,642, Jan. 17, 1989, abandoned.

[51] Int. Cl.[5] .............................................. B60G 11/38
[52] U.S. Cl. .................................. 280/715; 280/717; 280/718; 267/25; 267/30; 267/270; 267/271
[58] Field of Search ............... 280/718, 721, 723, 715, 280/716; 267/269, 25, 30, 270, 271

[56] References Cited

U.S. PATENT DOCUMENTS

| | | | |
|---|---|---|---|
| 1,376,803 | 5/1921 | Fekete | 267/271 |
| 1,452,693 | 4/1923 | Lord | 267/270 |
| 1,487,427 | 3/1924 | Asbury | 267/271 |
| 1,519,677 | 12/1924 | Furmidge | 267/271 |
| 1,835,575 | 12/1931 | Sanders et al. | 267/269 X |
| 2,237,056 | 4/1941 | Manning | 267/273 |
| 2,467,548 | 4/1949 | Bradley | 267/270 X |
| 2,802,663 | 8/1957 | Hovind | 267/28 |
| 3,083,034 | 3/1963 | Hollowell | 280/718 |
| 3,388,924 | 6/1968 | Wilson | 280/215 |
| 3,491,994 | 1/1970 | Reynolds | 267/269 |
| 4,125,276 | 11/1978 | Levasseur | 280/718 |

FOREIGN PATENT DOCUMENTS 1136383 5/1957 France .................. 280/718

Primary Examiner—Charles A. Marmor
Assistant Examiner—Tamara L. Finlay
Attorney, Agent, or Firm—Joseph Januszkiewicz

[57] ABSTRACT

A leaf spring suspension for a motor vehicle wherein the leaf spring has one end pivotally connected to the frame and the other end also connected to the frame via a torsion spring member. The torsion spring member has a shaft member which is pivotally connected to the other end of the leaf spring. The torsion spring member has an elastomeric sleeve whose inner bore surface is bonded to the shaft member. The torsion spring member also has an outer shell secured to the sleeve and also connected to the frame. A stop member is mounted on the outer shell for engagement by an abutment member on the bracket member to cut out the torsion spring and place the leaf spring in sole control as the suspension.

14 Claims, 5 Drawing Sheets

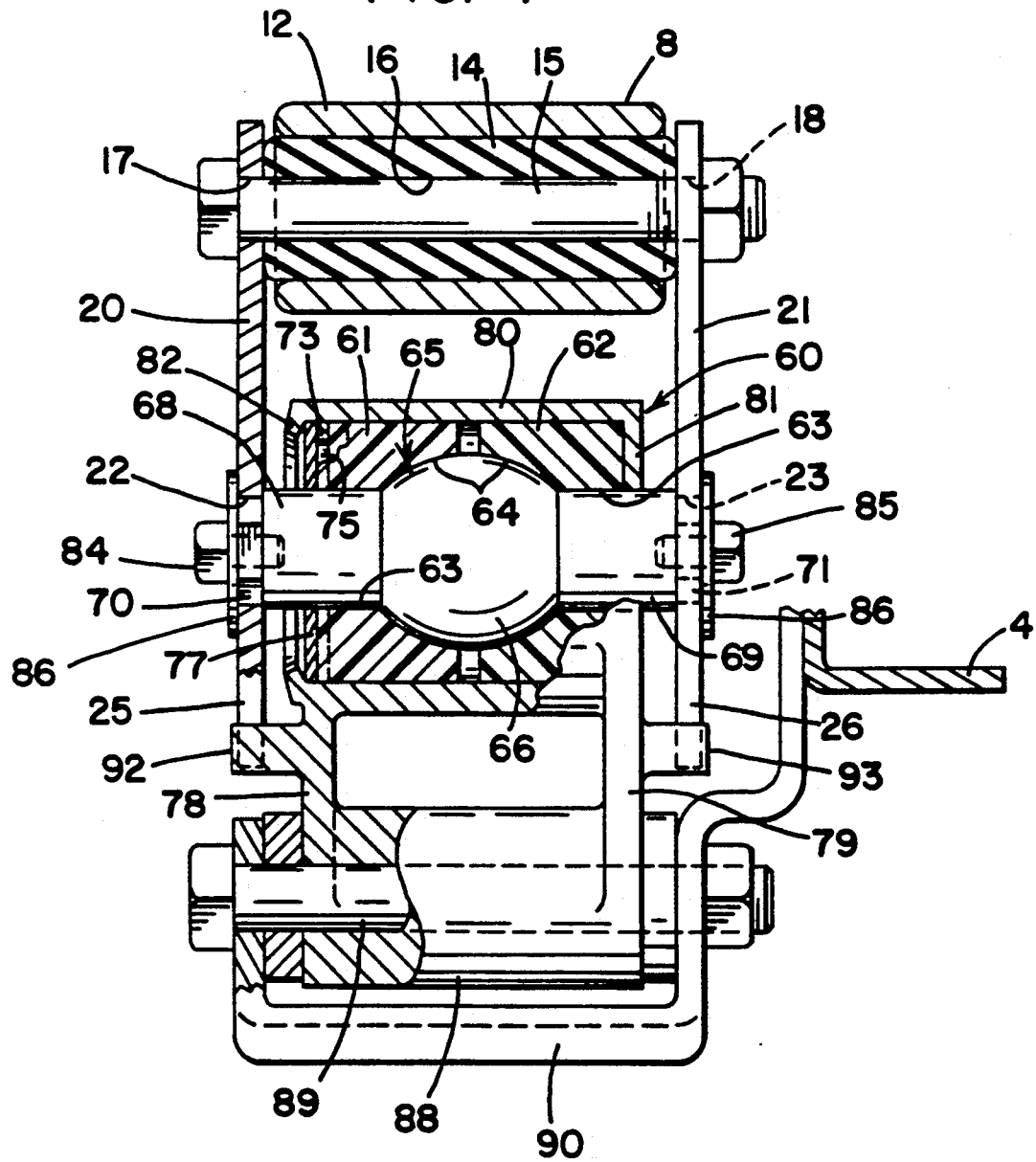

SUSPENSION SYSTEM

This is a continuation-in-part of copending application Ser. No. 07/297,642 filed on Jan. 17, 1989 now abandoned.

BACKGROUND OF THE INVENTION

This invention relates to a suspension system and more particularly to a vehicle suspension utilizing a torsion spring in cooperation with a leaf spring suspension.

It is conventional to use a leaf spring at each side of the vehicle to provide the suspension means between the frame of the vehicle and the axle, such that one end of the leaf spring is pivotally fixed to the frame and the other end connected via a shackle to the frame. In many instances such as in pick-up trucks as well as large trucks, the suspension means is designed to give acceptable rides where the vehicle is substantially loaded but provide a poor and uncomfortably stiff ride when the vehicle is very lightly loaded as with only the driver and possibly a passenger with no cargo. In some instances, this condition exists because the rear springs are designed for rated (full cargo) loads and such springs are far too stiff. In addition to the above, helper springs are also used in conjunction with the leaf spring but this only aggravates the problem.

The present invention is directed to a double link system employing a double-link torsion spring in series with a leaf spring wherein the torsion spring acts initially as the sole means for providing the suspension means giving a very comfortable ride under lightly loaded conditions. Such series connection of the torsion spring to the leaf spring dampens road noise that is normally transmitted through the ordinary shackle. As the load approaches the rated load value (cargo added), the double-link torsion spring locks up and the leaf spring takes up the full load providing the desired designed ride. Of importance in the above described suspension systems is that the leaf spring system itself exhibits a lower spring rate (softer) when the torsion spring which is in series with the leaf spring is not locked out.

SUMMARY OF THE INVENTION

The present invention is directed to a motor vehicle with a leaf spring suspension system wherein one end is connected via a shackle to the frame while the other end, a fixed end, is pivotally connected to the frame. The central portion of the leaf spring is secured to the wheel support member (axle) and the wheel. Such shackle has a torsion spring member interconnecting the frame to the leaf spring. The torsion spring has an outer shell with a stop member thereon pivotally connected to the frame. The torsion spring also includes a shaft member whose extension is pivotally connected to the one end of the leaf spring. A resilient means such as an elastomeric sleeve interconnects the shaft member and the outer shell to provide a torquing or wind up to where an abutment member on the shaft member engages a stop member on the outer shell to lock out the torsion spring and let the leaf spring take over the suspension functions. In lieu of the resilient means plastic or other means may be used for this purpose.

BRIEF DESCRIPTION OF THE DRAWINGS

FIG. 7 is a front elevational view of the torsion spring shown in FIG. 6 partly in cross section taken on line 7—7 of FIG. 6.

DESCRIPTION OF THE PREFERRED EMBODIMENT

Figure 1:
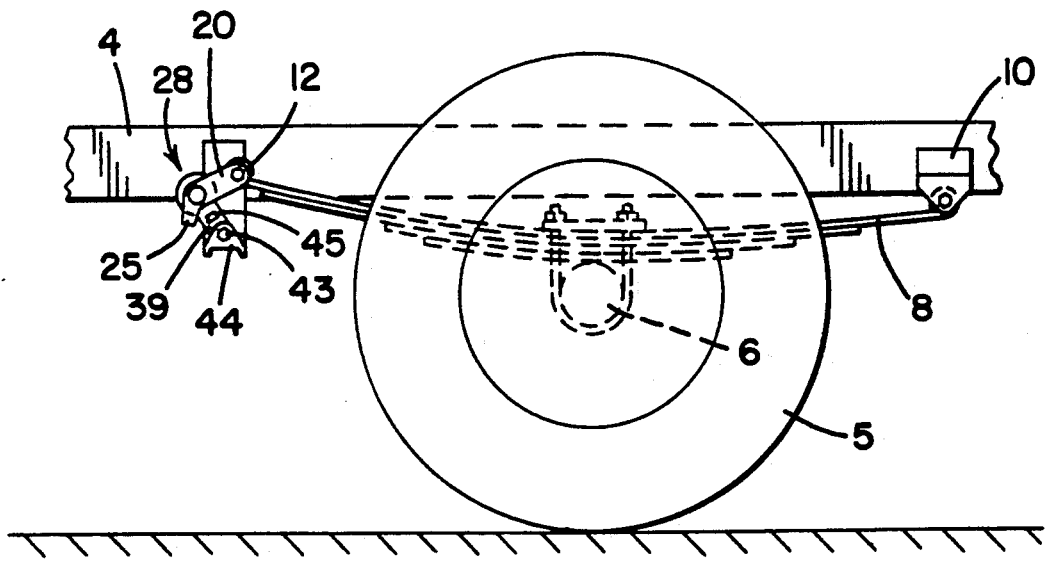
FIG. 1 is a side elevational view of a vehicle with the body removed showing a shackle and leaf spring in series wherein the shackle employs a torsion spring.

Referring now to the drawings wherein like reference numerals designate like or corresponding parts throughout the several views, there is shown in FIG. 1 the frame 4 (side bars only) of a vehicle with the usual wheel 5 supported by axle 6.

Figure 2:
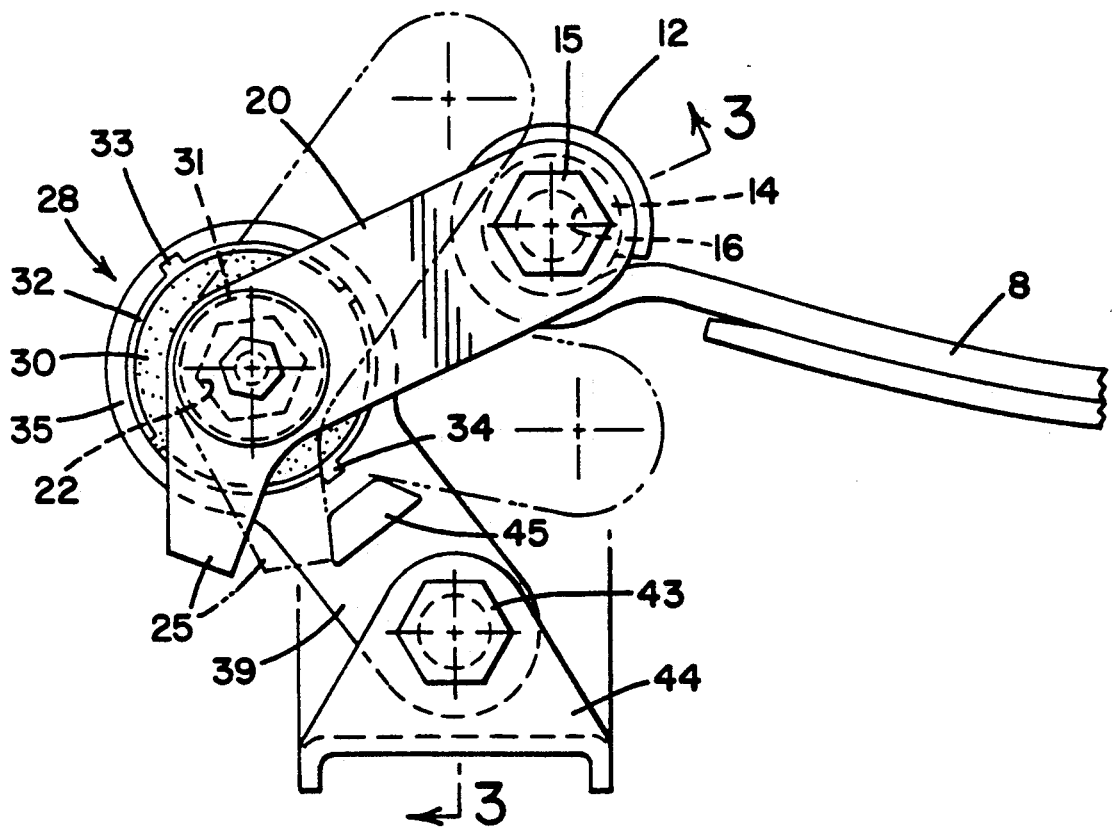
FIG. 2 is an enlarged side elevational view of the link torsion spring.
Figure 3:
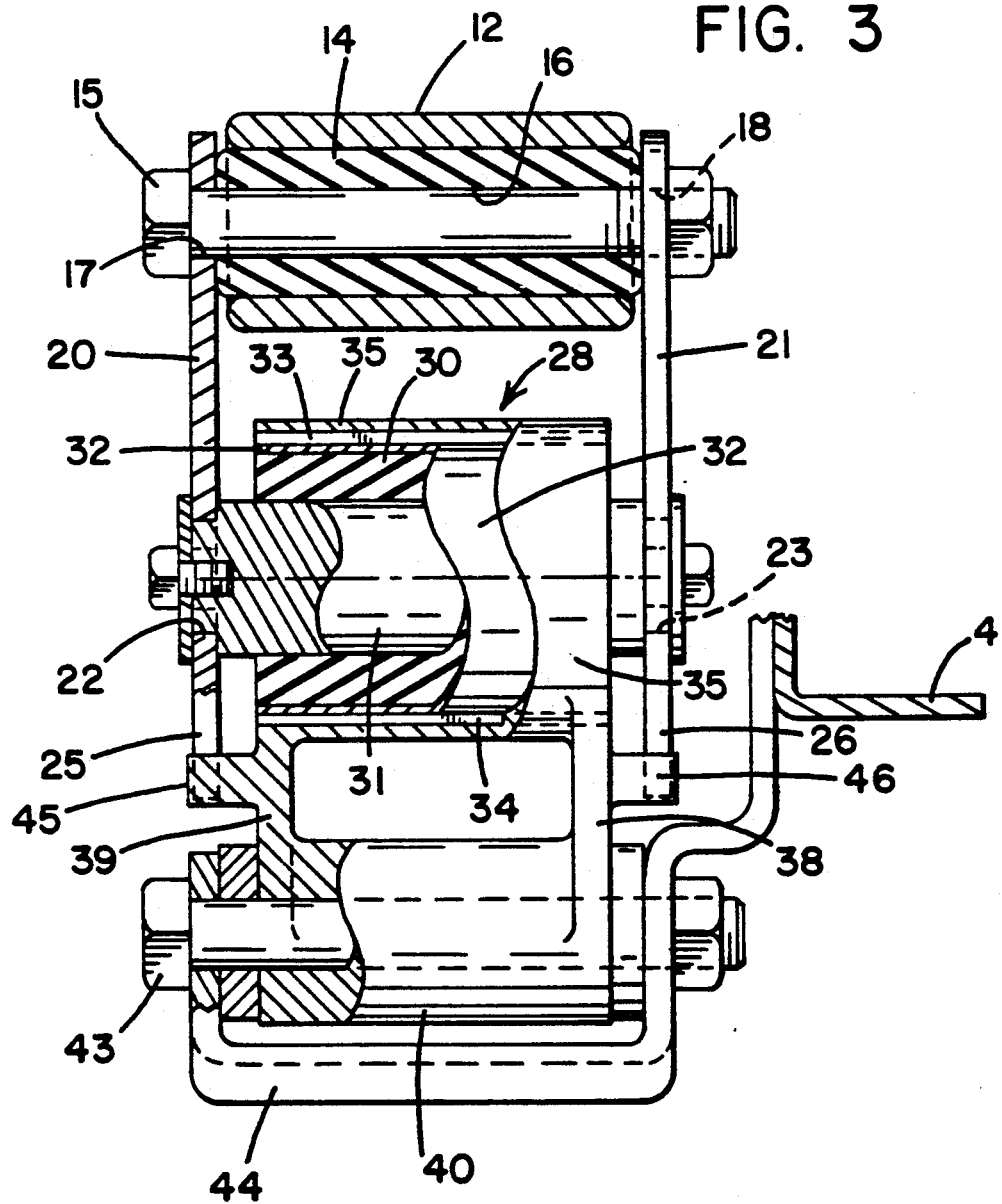
FIG. 3 is a front elevational view of the torsion spring partly in cross section shown as connected at one end to the leaf spring and the other end connected to the frame taken on line 3—3 of FIG. 2.
Figure 4:
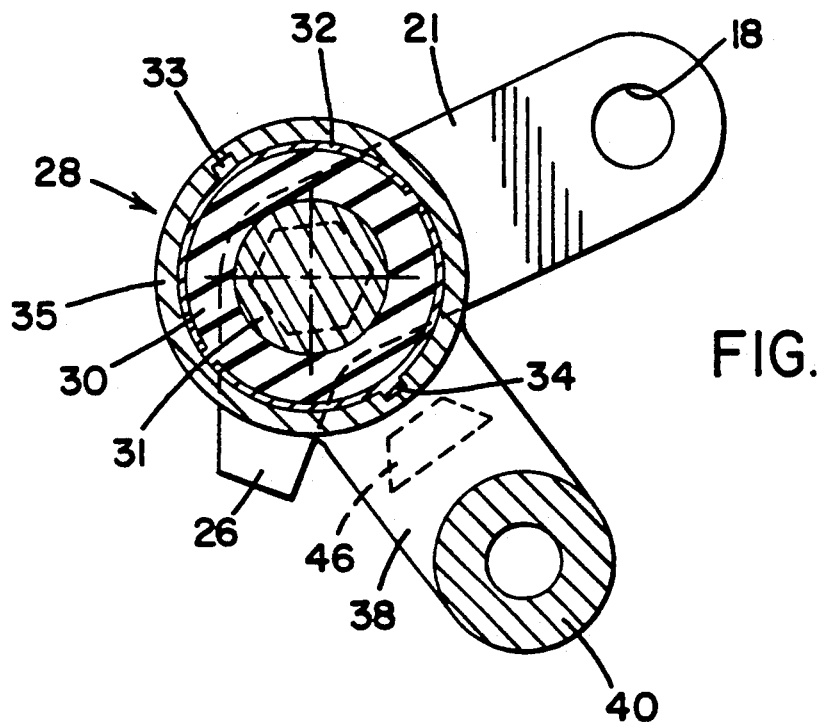
FIG. 4 is a side elevational view of the torsion spring in cross-section.

The vehicles leaf spring, which is designated 8, has its one end pivotally connected to a bracket 10 secured to the frame 4. The other end of the leaf spring 8 is formed into an eye 12 (FIG. 2) which surrounds a rubber sleeve 14(FIG.3). A bolt 15 passes through the central bore 16 of such sleeve 14 while also passing through bores 17 and 18 in the upper portion (as viewed in FIGS. 2 and 3 ) of a pair of brackets 20 and 21 respectively. The eye 12, rubber sleeve 14 and bolt 15 form the upper part of the shackle. The lower portion of brackets 20 and 21 have aligned polygonal bores 22 and 23 respectively. Extending downwardly from brackets 20 and 21 are projections or abutments 25 and 26 respectively (only projection 25 shown in FIG. 2).

Mounted at the lower end and between brackets 20 and 21 is a torsion spring assembly designated 28. The torsion spring includes an annular elastomeric or rubber member 30 having its inner peripheral surface bonded to a cylindrical shaft 31 as by a suitable adhesive. The outer circumferential surface of the annular rubber member 30 is suitably secured to the inner surface of an outer shell 32, which outer shell 32 has a pair of keys 33-34 for connecting such outer shell to an outer housing 35. Outer shell 32 may be made from a pair of half shells in lieu of a single integral shell 32. In lieu of the keys 33-34, other interconnecting means may be used to interconnect the outer shell 32 to the outer housing 35. In addition, outer shell 32 and outer housing 35 may be a single integral piece, such as a single integral outer shell composed of both of these elements.

Outer housing 35 has a pair of depending arms 38 and 39 (only arm 39 shown in FIG. 2) that are connected to a bearing housing 40. Thus the outer shell 32, housing 35 and bearing housing 40 form an integral outer housing member for the torsion spring 28. As seen in FIG. 3, the bearing housing 40 is connected via bolt 43 to a bracket 44 that is suitably riveted or welded to the frame 4 of the vehicle. Shaft 31 has its outer respective edges polygonal in shape to slidingly engage the polygonal bores 22 and 23 of bracket 20 and 21. Thus the eye 12 of leaf spring 8 which is pivotally connected to a pivot bolt 15, which bolt 15 supports brackets 20 and 21 become an integral part of torsion spring 28 by having the brackets 20 and 21 being connected to the shaft 31 of such torsion spring 28.

In the operation of the shackle and leaf spring described above, FIGS. 1 and 2 (in full lines) disclose the relationship of the components during an unloaded or very lightly loaded condition. Therein, the spring 8 has its eye 12 connected to the torsion spring 28, with the abutment 25 spaced from a stop member 45 that is suitably mounted on arm 39. As seen in FIG. 3 a stop member 46 is mounted on arm 38 which will come into contact with abutment 26 in the same manner as abutment 25 comes into contact with stop member 45 as to be described. Under the lightly loaded condition and as the wheel 5 encounters uneven irregularities in the road surface, leaf spring 8 will exert a corresponding force on the torsion spring 28 by having the eye 12 exert a bending force on brackets 20 and 21 of the double link shackle, wherein such brackets 20 and 21 are connected via the polygon bores 22 and 23 to the shaft 31 (of the torsion spring). The outer shell 32 via its keyed connection to the housings 35 and 40 is connected to the bracket 44 (via double links or arms 38 and 39) and frame 4 of the vehicle. The rubber annular member 30 which is the actual spring element is securely fastened between the movable inner shaft 31 and the stationary outer shell 35 such as to resist the movement of the shaft 31 and cushion the input forces from the wheel 5 via the leaf spring 8 to the shaft 31. As the vehicle is further loaded to where the respective bracket 20 and 21 rotate the shaft 31 a sufficient distance where the abutments 25 and 26 on such brackets 20 and 21 encounter the stop members 45 an 46 respectively, then the torsion spring 28 is effectively blocked or removed from consideration in responding to road forces on the wheel 5 and thereafter only the leaf spring 8 is effective in dampening the forces of the suspension system. The torsion spring 28 as above described is in series with the leaf spring 8 such that initially under lightly loaded conditions, the torsion spring dampens the forces and as such torsion spring 28 is blocked out, then only the leaf spring acts to dampen the road forces.

Figure 5:
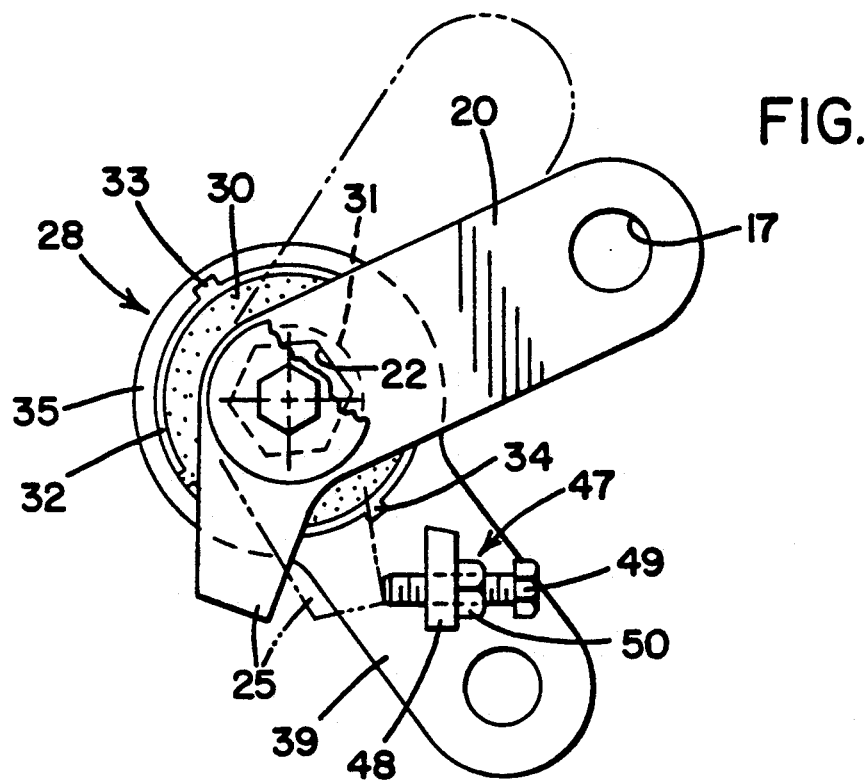
FIG. 5 is modified view of the shackle showing an adjustable torsion spring with a stop member.

A modification of the above described suspension system is shown in FIG. 5 wherein in lieu of fixed stop members 45 and 46 there is provided an adjustable stop member 47. Stop member 47 has an abutment 48 welded or otherwise suitably secured to the arms 39 and the other depending arm 38 (not shown in FIG. 5). A threaded bore in the abutment 48 receives a threaded bolt 49 with a nut 50 threaded thereon to help adjust the position of the bolt 49 thereon. Thus by adjusting threaded bolt 49 the point of encounter by abutments 25 and 26 with the threaded bolt 49 determines when the torsion spring 28 is blocked out of the suspension system and the leaf spring 8 takes over.

Figure 6:
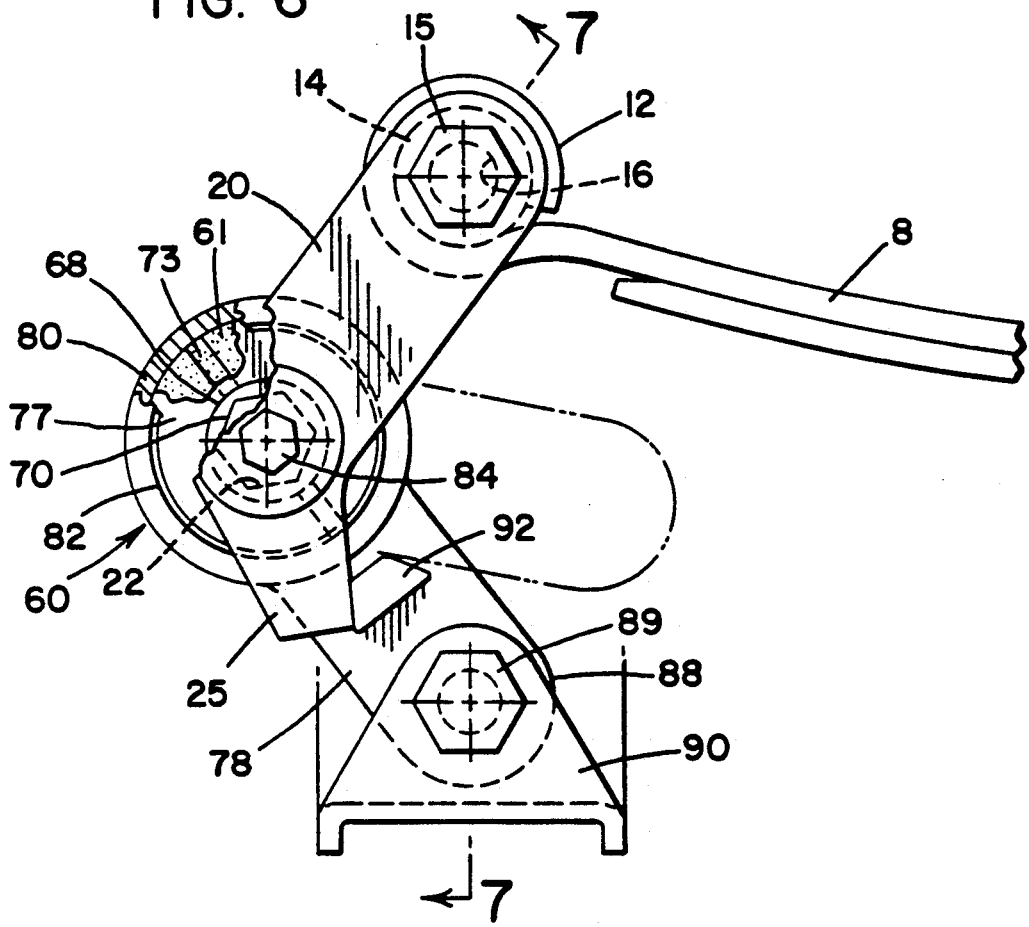
FIG. 6 is a side elevational view of a modification of the link torsion spring.
Figure 8:
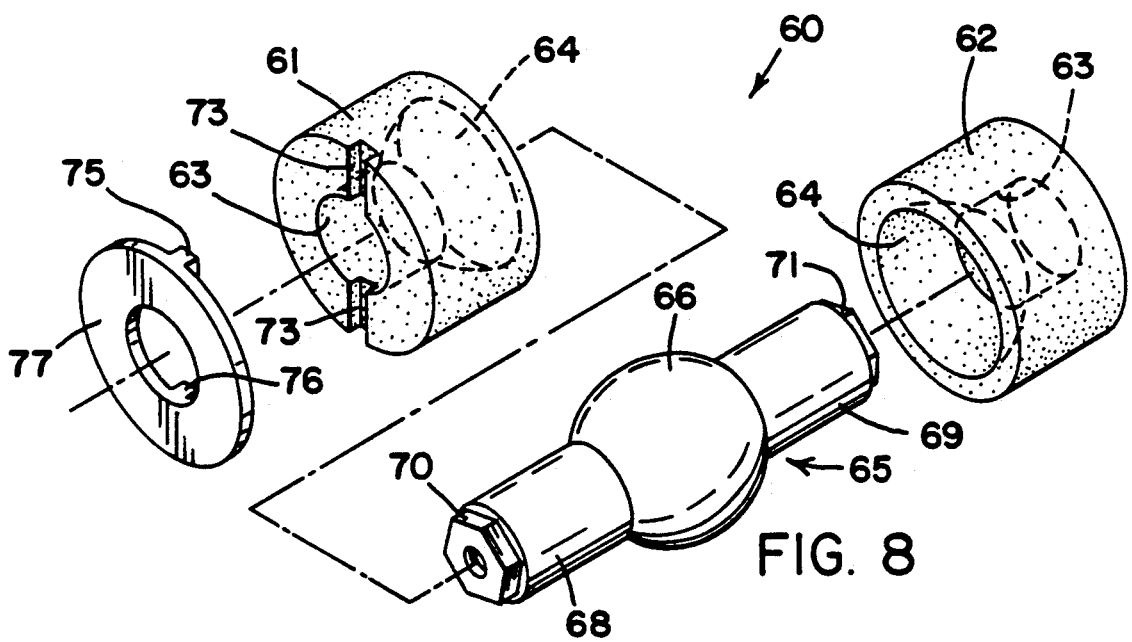
FIG. 8 is an exploded perspective view of a portion of the torsion spring as shown in FIGS. 6 and 7.

A further modification of the above described suspension system is shown in FIGS. 6 through 8 wherein like numerals will be used as in the first described embodiment to designate like parts and elements. As in the first described embodiment, the vehicle leaf spring is designated 8 and has its one end pivotally connected to frame 4 by a bracket similar to 10 as shown in FIG. 1. The other end of the leaf spring 8 has its eye 12 surrounding the rubber sleeve 14. The bolt 15 passes through the central bore 16 of the sleeve 14 (FIG. 7) as in the first embodiment while passing through bores 17 and 18 in the upper portion of the pair of brackets 20 and 21, respectively. The eye 12, rubber sleeve 14 and bolt 15 as in the first embodiment form the upper part of the shackle. The lower portion of brackets 20 and 21 have aligned polygonal bores 22 and 23, respectively. Extending downwardly from brackets 20 and 21 are the projections or abutments 25 and 26.

Mounted at the lower end and between brackets 20 and 21 is a torsion spring assembly designated 60. The torsion spring 60 includes a pair of annular elastomeric or rubber member 61 and 62 wherein each rubber member 61 and 62 has a central bore 63 that opens into a semi-spherical recess 64. Each rubber member 61 and 62 encompass the respective ends of a shaft 65 which has a spherically shaped intermediate portion 66 merging with a pair of spaced cylindrically shaped rods 68 and 69 that terminate into polygonal shaped abutments 70 and 71 which are received by the polygonal bores 22 and 23, respectively. The one end of rubber member 61 has a pair of diametrically opposed slots 73 that receive projections 75 and 76 of a retainer ring 77. The rubber members 61 and 62 along with shaft 65 and the retainer ring 77 is held as an integral unit by a cup-shaped cylindrical shell 80 having an annular end 81 on one side and opening on the other end to permit insertion of the rubber members 61 and 62 and thereafter the periphery end portion is rolled over inwardly as at 82 to retain the rubber members 61 and 62 along with shaft 65 and ring 77 therein. The torison spring 60 is retained in its position by the securing of the shaft 68 by threaded bolts 84–85 and washers 86 that are received by the threaded bore at the respective ends of shaft 65.

Shell 60 has a pair of depending arms 78 and 79 that are connected to a bearing housing 88. The shell 60 along with the arms 78 and 79 with bearing housing 88 form an integral housing member for the torsion spring 60.

The bearing housing 88 is connected via bolts 89 to a bracket 90 that is suitably riveted or welded to the frame 4 of the vehicle. The eye 12 of the leaf spring 8 is pivotally connected to the bolt 15, which bolt 15 supports brackets 20 and 21 which are an integral part of the torsion spring 60 since the polygonal bores 22 and 23 receive the shaft 65 that forms the inner or one portion of the torsion spring 60 while the rubber elements 61 and 62 along with shell 80 and bearing housing 88 form the other portion of the torsion spring 60. In the assembling of the torsion spring it is important to crimp the end 82 of the shell 80 sufficiently to place the pair of rubber members 61 and 62 in compression. As in the first embodiment stops or stop members 92 and 93 are mounted on arms 78 and 79 respectively to limit the rotation of brackets 20 and 21 so that the torsion spring is locked out and the leaf spring 8 takes over the loading In the operation of the modified form of shackle and leaf spring as just described, there is shown in FIG. 6, the relationship of the component parts of the shackle during an unloaded or very lightly loaded condition. As seen therein, the spring 8 has its eye 12 connected to the torsion spring 60, with the abutments 25 and 26 spaced from the stop members 92 and 93 that are integral with arm members 78 and 79. Under a lightly loaded condition of the vehicle and as the wheel 5 that is connected to the leaf spring 8 encounters uneven irregularities in the road surface, leaf spring 8 will exert a corresponding force or load on the torsion spring 60 by having the eye 12 exert a pivoting force or action on brackets 20 and 21 such that brackets 20 and 21 which are connected via the polygonal bores 22 and 23 to the shaft 65, will tend to pivot such shaft 65 and exert a torsional force to rubber members 61 and 62, which rubber members are under compression. Such action on the rubber members 61 and 62 is resisted by the shell 80, the depending arm members 78 and 79 as well as the bearing housing 88 which is connected rigidly to the vehicle frame 4 via bracket 90. As the vehicle is further loaded to where the respective brackets 20 and 21 rotate the shaft 65 a sufficient distance to where the abutments 25 and 26 encounter the stop members 92 and 93 respectively, then the torsion spring 60 is effectively blocked or removed from the suspension system in responding to road forces on the wheel 5 and thereafter only the leaf spring 8 is effective in dampening the forces of the suspension system. As in the first described embodiment, the torsion spring 60 is in series with the leaf spring 8 such that initially under lightly loaded conditions of the vehicle and vehicle frame 4, the torsion spring 60 dampens the forces and as the loading is increased then only the leaf spring operates to dampen the road forces.

It will be apparent that, although a specific embodiment and certain modifications of the invention have been described in detail, the invention is not limited to the specifically illustrated and described constructions since variations may be made without departing from the principles of the invention.

We claim:

1. A motor vehicle suspension system having a frame, a wheel support member, a leaf spring secured to said wheel support member, first means pivotally connecting one end of said leaf spring to said frame, second means connecting the other end of said leaf spring to said frame, said second means comprising a torsion spring member, said torsion spring member having a central shaft, a lever member pivotally interconnecting said other end of said leaf spring to said central shaft, an annular elastomeric member having an inner bore with an inner annular surface, said annular elastomeric member having an outer annular surface, said inner annular surface secured to said shaft, an outer housing member secured to said outer annular surface of said elastomeric member, said outer housing member pivotally connected to said frame, and said outer housing member having a stop member, and said lever member having an abutment movable into engagement with said stop member upon rotation of said central shaft to thereby make said leaf spring as the sole suspension means.

2. A motor vehicle suspension system as set forth in claim 1 wherein said stop member is adjustably mounted on said housing member.

3. A motor vehicle suspension system as set forth in claim 1 wherein said housing member includes a pair of arm members connected to a bearing member, and said bearing member being pivotally connected to said frame.

4. A motor vehicle suspension system as set forth in claim 3 wherein said stop member is adjustably mounted on said arm members for selective engagement by said abutment means.

5. A motor vehicle suspension system as set forth in claim 1 wherein said annular elastomeric member consists of a pair of members, each of said elastomeric members are in a compressed state in said outer housing member.

6. A motor vehicle suspension system as set forth in claim 5 wherein said central shaft has an intermediate portion that is spherically shaped, and each of said pair of annular elastomeric members have hemi-spherical recesses abuttingly engaging portions of said spherically shaped intermediate portion.

7. A motor vehicle suspension system as set forth in claim 6 wherein said pair of annular elastomeric members are in a state of compression.

8. A motor vehicle suspension system having a frame, a wheel support member, a leaf spring secured to said wheel support member, first means pivotally connecting one end of said leaf spring to said frame, second means connecting the other end of said leaf spring to said frame, said second means including a torsion spring member, said torsion spring member having a shaft member means pivotally connected to the other end of said leaf spring, an elastomeric sleeve having its inner bore surface secured to said shaft member means, a housing member encompassing said elastomeric sleeve and secured thereto forming said torsion spring member with said elastomeric sleeve and said shaft member means, said housing member pivotally connected to said frame, a stop member secured to said housing, and an abutment mounted on said shaft member means for contact with said stop member upon torquing of said elastomeric sleeve whereby said leaf spring thereafter acts as the sole suspension means.

9. A motor vehicle suspension system as set forth in claim 8 wherein said stop member is adjustably mounted on said housing member to provide a predetermined torquing of said torsion spring before said abutment contacts said stop member.

10. A motor vehicle suspension system as set forth in claim 8 wherein said pivotal connection of said shaft member means to said other end of said leaf spring incudes a pair of laterally spaced link members, each of said link members having one end pivotally connected to said other end of said leaf spring, the other spaced ends of said link members being fixedly connected to said shaft member.

11. A motor vehicle suspension system as set forth in claim 10 wherein said fixed connection of said other spaced ends of said link members comprises octagonal shaped ends on said shaft that mate with octagonal shaped opening on said other spaced ends of said link members.

12. A motor vehicle suspension system as set forth in claim 10 wherein said housing member has a pair of laterally spaced arm members, said spaced arm members pivotally connected to said frame.

13. A motor vehicle suspension system as set forth in claim 12 wherein said elastomeric sleeve consists of a pair of elastomeric members, and each of said elastomeric members are in a compressed state in said housing member.

14. A motor vehicle suspension system as set forth in claim 13 wherein said shaft member means includes a longitudinal shaft whose intermediate central portion is spherically shaped, and each of said pair of elastomeric members have hemi-spherical recesses that abuttingly engage portions of said sphericlaly shaped central portion of said shaft.

* * * * *